United States Patent
Stadelmann et al.

(10) Patent No.: US 7,156,307 B2
(45) Date of Patent: Jan. 2, 2007

(54) COLOR CODE FOR DEVICE CONFIGURATION

(75) Inventors: Beat Stadelmann, San Diego, CA (US); Stephan Walter Emmenegger, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 10/739,717

(22) Filed: Dec. 18, 2003

(65) Prior Publication Data

US 2005/0133602 A1  Jun. 23, 2005

(51) Int. Cl.
*G06K 7/10* (2006.01)
(52) U.S. Cl. .................................................. 235/454
(58) Field of Classification Search ........... 235/462.04, 235/469, 454; 382/162, 165
See application file for complete search history.

(56) References Cited

U.S. PATENT DOCUMENTS

| | | | | |
|---|---|---|---|---|
| 5,430,558 A | * | 7/1995 | Sohaei et al. ............... | 358/473 |
| 5,790,240 A | * | 8/1998 | Ishikawa et al. ............... | 355/68 |
| 5,992,748 A | * | 11/1999 | Takahashi et al. ...... | 235/462.04 |
| 6,002,124 A | * | 12/1999 | Bohn et al. ............... | 250/208.1 |
| 6,149,063 A | * | 11/2000 | Reynolds et al. ....... | 235/472.02 |
| 6,375,075 B1 | * | 4/2002 | Ackley et al. .......... | 235/462.04 |
| 6,384,907 B1 | * | 5/2002 | Gooch .................... | 356/139.03 |
| 6,478,223 B1 | * | 11/2002 | Ackley .................... | 235/462.04 |
| 6,598,798 B1 | * | 7/2003 | Kashi et al. ............ | 235/462.25 |
| 6,834,807 B1 | * | 12/2004 | Ehrhart et al. .............. | 235/469 |
| 6,874,687 B1 | * | 4/2005 | Kubota ................... | 235/462.11 |
| 6,902,113 B1 | * | 6/2005 | Sali et al. .............. | 235/462.04 |

FOREIGN PATENT DOCUMENTS

EP  1239407 A2  9/2002

OTHER PUBLICATIONS

Short et al., U.S. Appl. No. 10/377,423, Feb. 28, 2003.
Carlson, Girard J., U.S. Appl. No. 10/690,048, Oct. 20, 2003.

* cited by examiner

*Primary Examiner*—Ahshik Kim
(74) *Attorney, Agent, or Firm*—Robert D. Wasson

(57) ABSTRACT

A method is disclosed that scans a colored code using a scanner disposed internal a device. As setting of the device is then adjusted based on a color of the colored code.

19 Claims, 5 Drawing Sheets

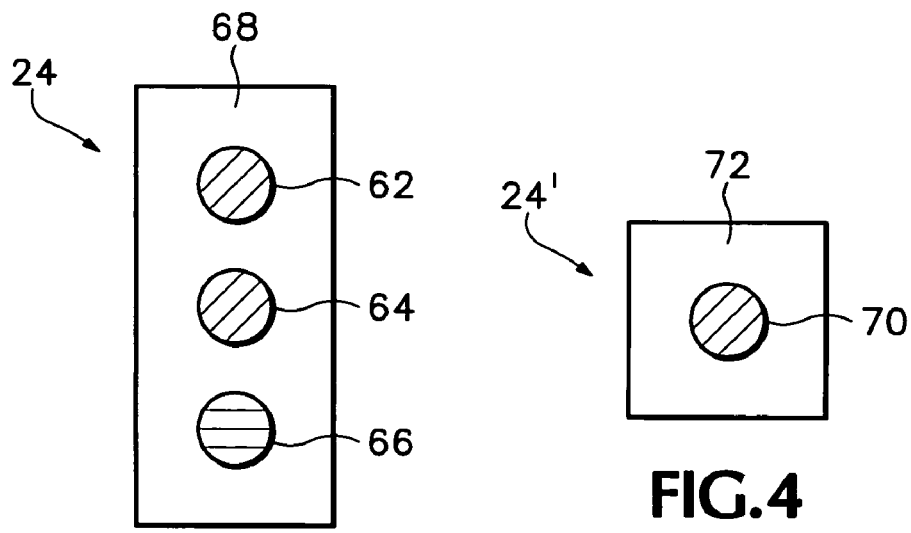
FIG.3
FIG.4
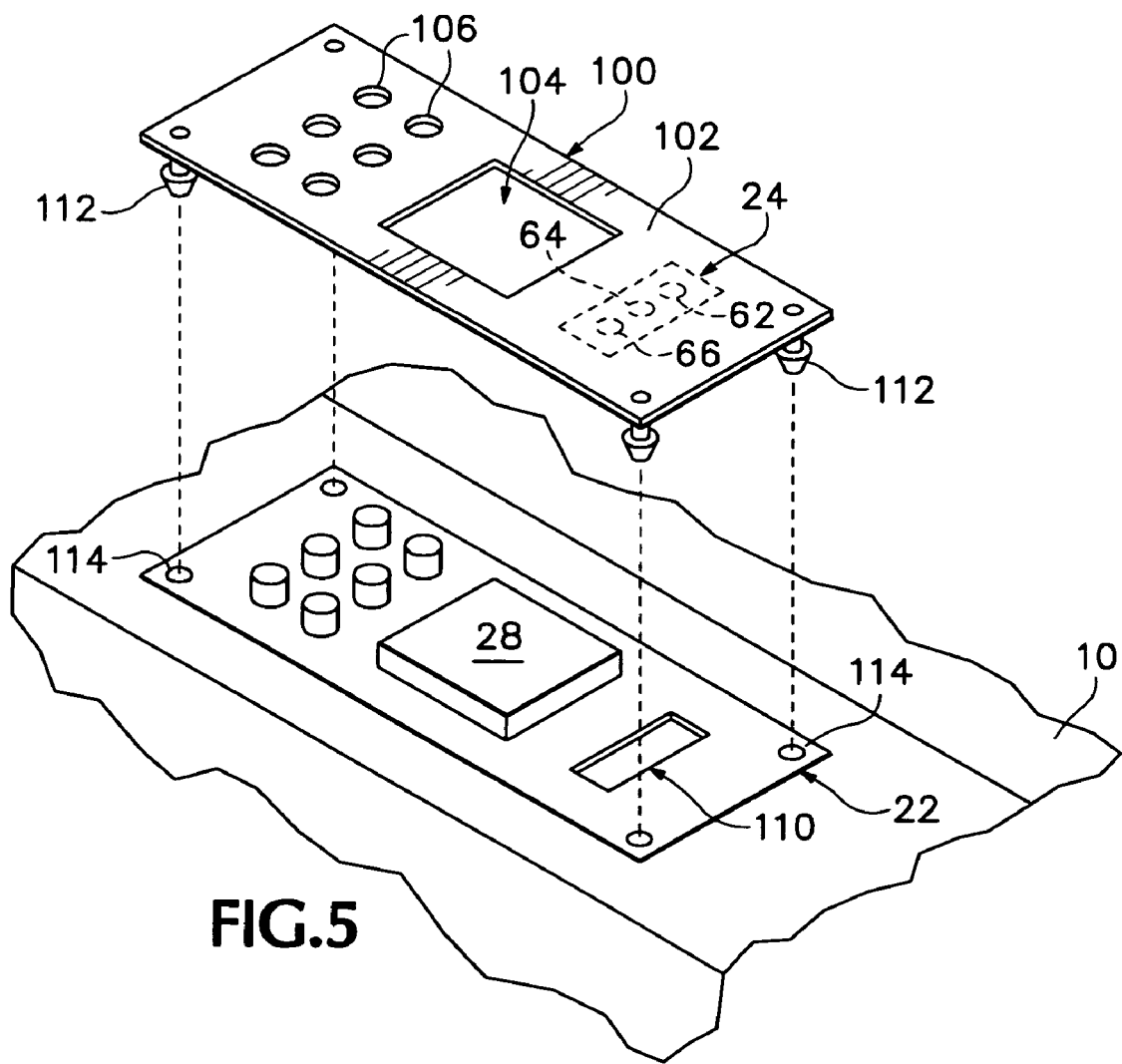
FIG.5

COLOR CODE FOR DEVICE CONFIGURATION

BACKGROUND

Some electronic devices, such as a multifunction device capable of one or more of printing, faxing, scanning, copying, or the like, are typically configured with certain attributes. For example, a device configured for use in one country might be configured with different language attributes than a device configured for use in a different country. As another example, devices might be configured with differently enabled features or functionality. Configuration of such devices at the manufacturer tends to complicate the manufacturing ordering process, assembly process, or both. Configuration of the device by the user may be burdensome for the user. Further, if the user incorrectly configures the device, improper operation may result.

BRIEF DESCRIPTION OF THE DRAWINGS

FIG. 3 is a plan view of a colored code in accordance with an example embodiment.

FIG. 4 is a plan view of a colored code in accordance with another example embodiment.

FIG. 5 illustrates a bezel and base portions of a control panel in accordance with an example embodiment.

DETAILED DESCRIPTION OF THE EXAMPLE EMBODIMENTS

Figure 1:
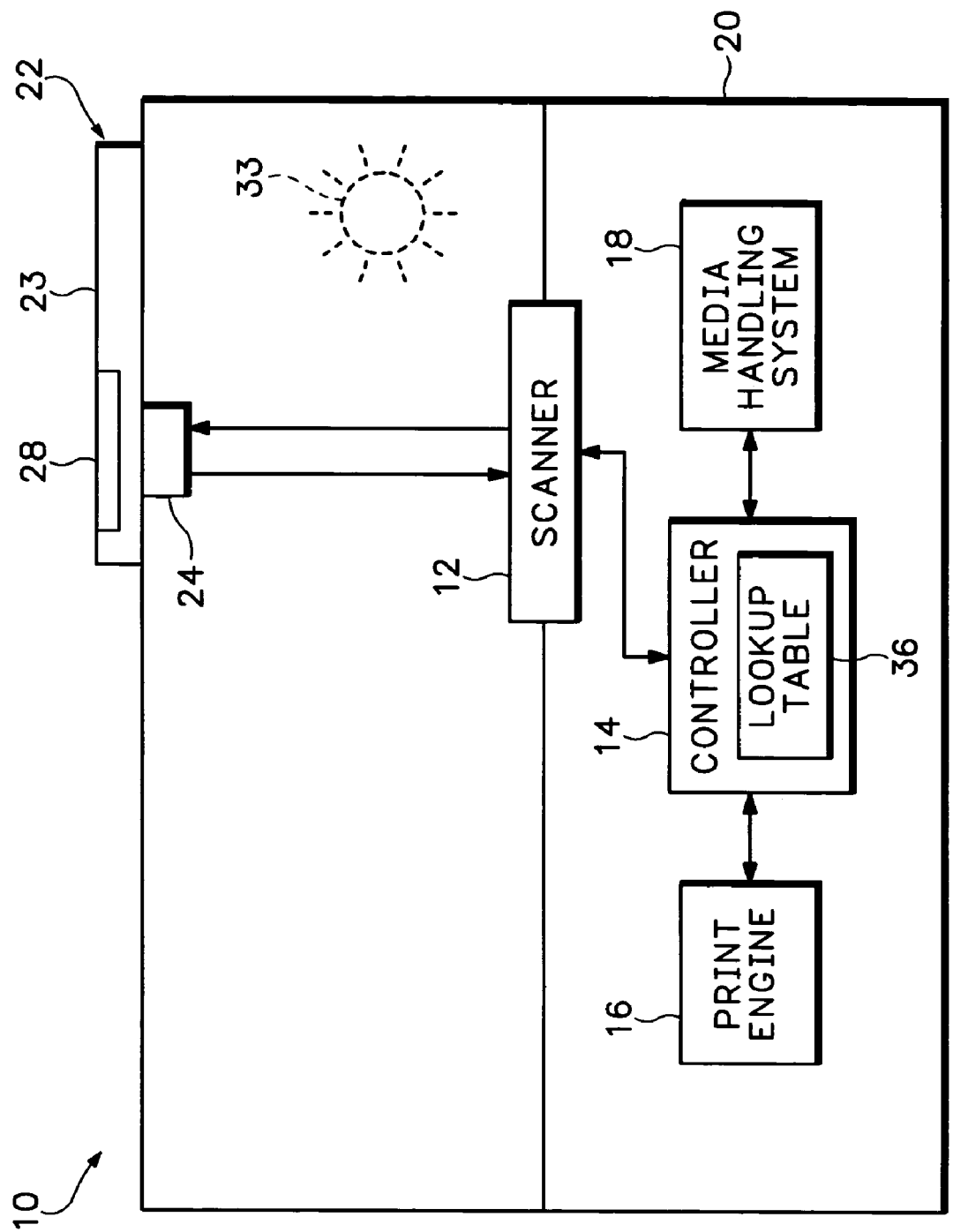
FIG. 1 schematically illustrates a device in accordance with an example embodiment.

FIG. 1 schematically illustrates a device 10. The device 10 may comprise, for example, a scanner, a facsimile device, a printer, a copier, or a device incorporating one or more of the functions of a scanner, facsimile device, a printer, a copier, or the like. In some embodiments, the device 10 may comprise device known as an All In One device capable of at least printing and scanning. In the example embodiment shown in FIG. 1, the device 10 includes a scanner 12, a controller 14, a print engine 16, and a media handling system 18 disposed within a housing 20. The device 10 is shown as also including a control panel 22 on the housing 20.

A colored code 24 is optically coupled with the scanner 12 such that the scanner 12 may scan the colored code 24. In the embodiment illustrated in FIG. 1, the colored code 24 is positioned below a top surface 23 of the control panel 22 such that the colored code 24 is internal the device 10. The location of the colored code 24 may vary. As an example, the colored code 24 may comprise a label adhered to the device. In other embodiments, the colored code may be directly painted or otherwise disposed internal the device 10 and optically coupled to the scanner 12. Alternatively, the colored code 24 may comprise one or more colored molded plastic parts or features attached to or formed internal the device 10. Of course, the position and type of the colored code 24 may vary.

According to some embodiments, the colors of the code comprise chromatic colors. In other embodiments, the colors of the code may include achromatic colors black, white, and gray.

In one embodiment, the scanner 12 is configured to distinguish and identify different colors. As a specific example, the scanner 12 may be configured to distinguish about 256 different colors. The different colors may include different shades of a single color and well as different tints. The configuration details of the scanner may, of course, vary. In different applications, the scanner 12 may be configured to distinguish a number of colors other than 256.

According to some embodiments, the scanner 12 scans the colored code 24 by transmitting light 32 from the scanner 12 toward the colored code 24 and detecting colored light 34 reflected from the colored code 24. In an alternate embodiment, the light 32 may be transmitted from a light source 33, separate from the scanner 12. The scanner 12 identifies one or more colors of the colored code 24. Further, in some embodiments, the scanner 12 also identifies the positions of different colors of the colored code 24.

The controller 14 receives data from the scanner 12 that indicates one or more colors of the colored code. The controller 14 may also receive data from the scanner that indicates the positions of different colors. The position information may include the positions of the different colors relative to each other.

In some embodiments, the controller 14 includes a processor and a memory, such as a non-volatile memory. Controller 14 may comprise any suitable device or apparatus, such as a computer, microprocessor, or other logic unit, or combination of devices or apparatus, adapted to control scanner 12, print engine 16, and media handling system 18. The controller 14 may include a processor and a memory coupled to the processor for storing data, such as data corresponding to device settings, and operating instructions. Such instructions may be embodied as hardware, firmware, or software.

A lookup table 36 may be stored in the memory. In one embodiment, the lookup table 36 associates a color with one or more device settings or configurations. Upon receipt of data from the scanner, the controller 14 associates a device setting with the color or colors of the colored code 24. The controller 36 then modifies, adjusts, sets, or configures one or more device settings that are associated with the color or colors of the colored code 24.

The device settings that may be set, adjusted, modified, or changed based on the color or colors of the colored code 24 may vary. As one example, these settings may include localization settings. As another example, these settings may include enablement, disablement, or modification of certain device functionality.

One example localization setting is a language setting that identifies the language of the text displayed at display 28 provided as a part of the control panel 22. Hence, in this embodiment, the device 10 may be capable of displaying text in any of a plurality of languages. Upon detecting a localization setting based on the colored code 24, the controller 14 may configure the device 10 to display menu text at the display 28 in a language, such as Spanish, associated with that localization setting. Other localizations settings may be alternatively or additionally employed.

One example of a device functionality setting is a print speed setting that identifies a print speed at which the print engine 16 operates. Hence, in this embodiment, the device 10 may be capable of different print speeds. Upon detecting a device functionality setting the controller 14 disables print speed settings other than the print speed setting identified and enables the identified print speed setting.

Another example of device functionality setting that may be set on the basis of the color(s) of the colored code is a default paper size. That is, for some detected colors or color combinations, the controller 36 might adjust a default paper size setting for the print engine, the media handling system, or both to be A4 size. For other colors or color combinations the controller 36 might adjust the default paper size to be 8 ½×11 inches.

As yet another example, device attributes or functions that might be adjusted based on the detected color(s) of the colored code 24 include, but are not limited to copy speed, number of maximum copies, copy enlargement maximum, copy reduction minimum, default number of speed dial facsimile numbers stored in memory, and the like. Other device functionality settings may be alternatively or additionally employed.

Because one or more device settings may be set by the controller based on the colored code 24, the user may be relived of having to perform such settings. In some applications a language setting might be desirable to set automatically as set forth above, rather than requiring the user to manually configure a default language setting using one or more user input devices.

Additional details are disclosed in pending U.S. patent application Ser. No. 10/377,423, filed Feb. 28, 2003, the disclosure of which is hereby incorporated by reference in its entirety.

Figure 2:
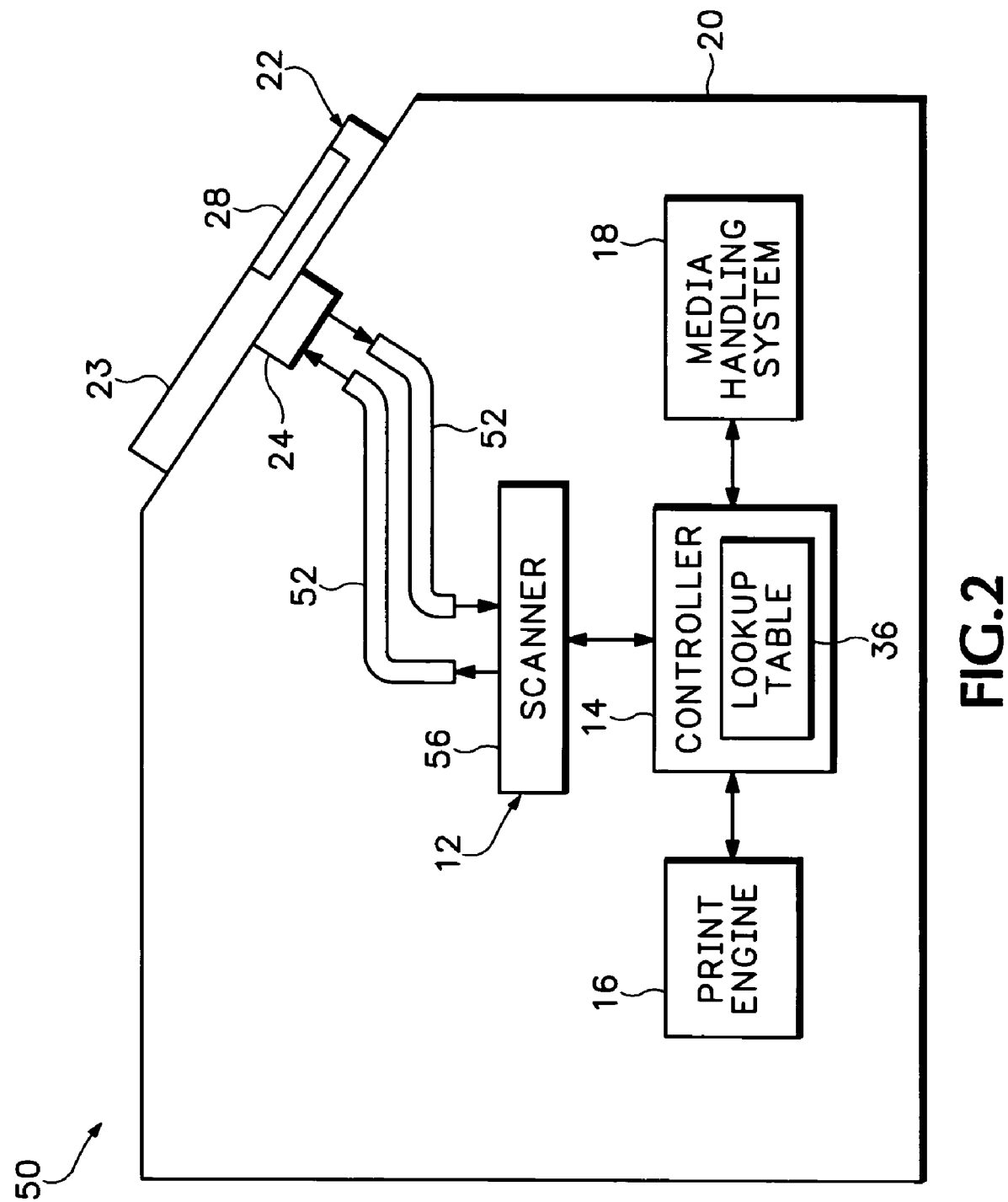
FIG. 2 schematically illustrates a device in accordance with another example embodiment.

FIG. 2 illustrates a device 50 in accordance with another embodiment. The device 50 is identical to the device 10 shown in FIG. 1 and described above, except as follows. The device 50 includes one or more light guides 52 for directing light between the scanner 12 and the colored code 24. As shown in FIG. 2, the control panel 22 of FIG. 2 is not disposed directly above the scanner 12 and may have a bottom surface 54 that is not parallel with a top surface 56 of the scanner 12. In some embodiments, the light guides 52 may comprise fiber optic cable, although other conduits suitable for transmitting light may be alternately employed.

FIG. 2 illustrates the colored code 24 disposed near the control panel 22. In other embodiments, the colored code 22 may be positioned elsewhere. For example, in some embodiments a removable member (not shown) with a colored code thereon may be positioned into optical coupling with the scanner directly or via one or more light conduits. As a specific example of such an implementation, the colored code may be disposed on a card, or other part, that is positioned in optically coupled relationship with the scanner by a user. Such a card could comprise a plastic card inserted via slot formed in the device such the colored code on the card could reflect light to the scanner, either directly or via a light conduit.

FIG. 3 illustrates an example colored code 24. The colored code 24 comprises three markings 62, 64, 66 on a background 68. The background 68 may be white, although the color of the background 68 may vary. The markings 62, 64, 66 are illustrated as being in spaced relation to each other with the background 68 visible between the markings. In other embodiments, the markings may be adjacent one another without background visible between the markings.

For example, the colored code 24 having markings 62, 64, 66 colored red, yellow, and blue, respectively, may refer to a first setting or set of settings and the colored code 24 having markings 62, 64, 66 blue, green, red, respectively may refer to a second, different, setting or set of settings. Given the number of different colors that may be employed for each of the markings 62, 64, 66 the number of unique combinations is large enough to accommodate the different settings for some devices. As an example, using just six different colors for the markings 62, 64, and 66 results in 729 unique combinations. Of course, the number of markings on the colored code 24 may vary. In addition, the number of different colors used on the markings may also vary. The associations between the various device settings and colors or color combinations may be stored in lookup table 36 (FIG. 1).

FIG. 4 illustrates an example colored code 24', in accordance with another embodiment. In this embodiment, the colored code 24' has a single colored marking 70 on a background 72. The color of the marking 70 is associated with a particular setting for the device 10. Some scanners are capable of accurately differentiating 256 colors. As such, the colored code 24' may be used to indicate one of a large number of settings.

FIG. 5 illustrates a bezel 100 and a control panel 22 of the device 10. As shown, the bezel 100 has a bottom surface 102, opening 104, and holes 106. The control panel 22 includes the display 28, and input devices 108, which may comprise buttons or other suitable input device. The control panel 22 also includes aperture 110. The bezel 100 is secured over the control panel 22 by fasteners 112 that may be secured in openings 114. In the illustrated embodiment, the bezel 100 is positioned over the control panel 22 such that the opening 104 is aligned with the display 28 such that display 28 is visible through the opening 104 to a user. The input devices 108, such as buttons, extend through the holes 106 when the bezel 100 is positioned over the control panel 22 to permit a user to input information to the device 10 using the input devices 106.

A colored code 24 is positioned at the bottom surface 102 of the bezel 100. When the bezel 100 is positioned over the control panel 22, the colored code 24 is aligned with the aperture 110 such that the colored code 24 is optically coupled, or visible, to a scan engine, such as scanner 12 (FIG. 1) or scanner 56 (FIG. 2). As discussed above, the optically coupling may be direct as in FIG. 1 or via one or more light conduits (FIG. 2). Hence, when the bezel 100 is positioned over the control panel 22, with the fasteners 112 secured in openings 114, the markings 62, 64, 66 of the colored code 24 may be viewed and scanned by a scanner through the aperture 110. The aperture 110 may comprise a slot or an aperture of other suitable shape and dimension.

A top surface (not shown) of the bezel 102 is opposite the bottom surface 102 and may, in some embodiments, include text in a particular language. The language of the text on the top surface of the bezel 102 may be in a same language as is associated with the colored code 24 in the lookup table described above. For example a bezel for use in the United States might have English text on the top surface of the bezel 102 and a bezel for use in Spain might have Spanish text on the top surface of the bezel 102. Thus, the same device 10 may be used for different countries and for users of different languages by mounting a bezel 102 having a colored code 24 that is associated with device settings, such as language settings, appropriate for a given country.

Figure 6:
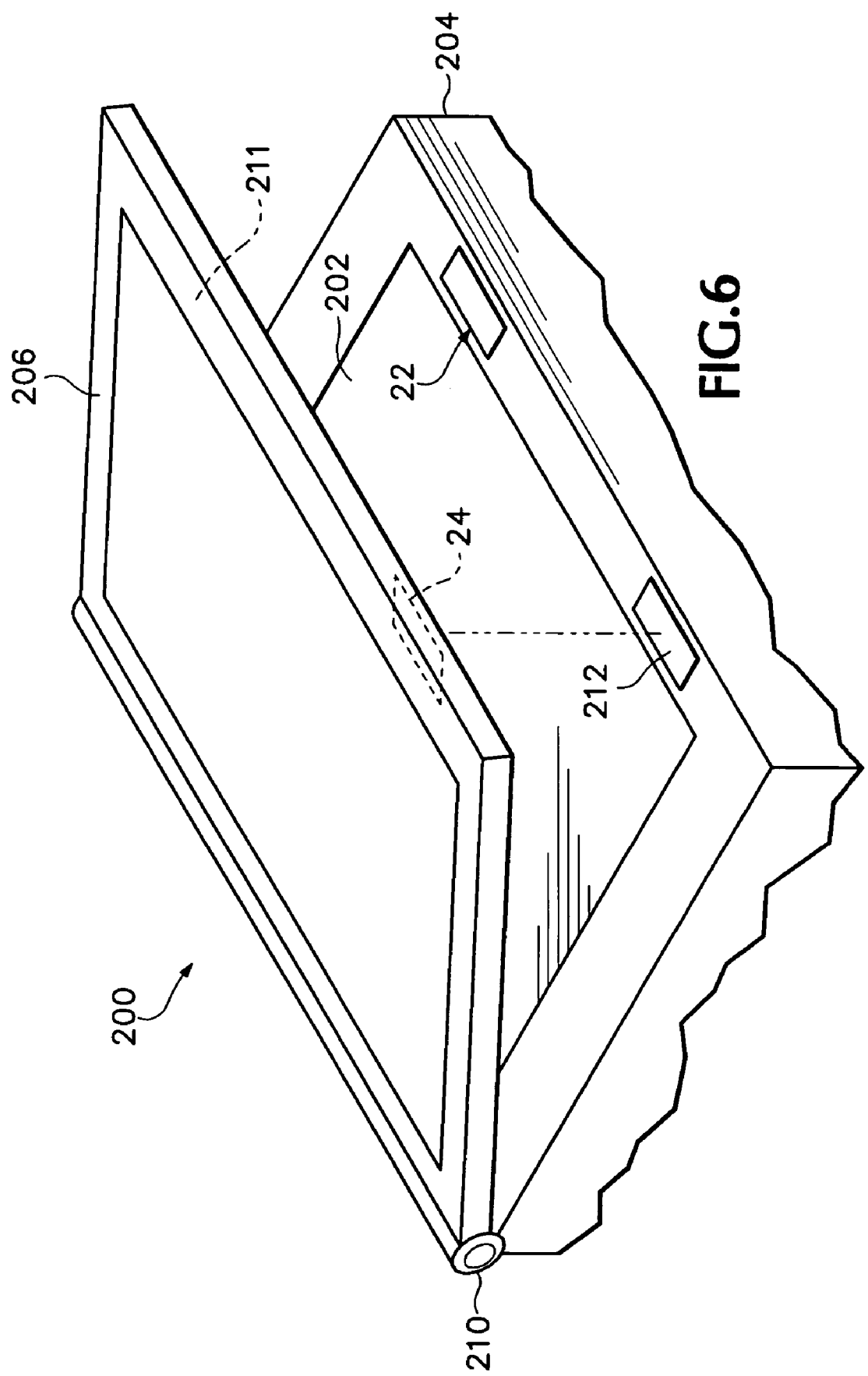
FIG. 6 illustrates an embodiment of a device in accordance with another example embodiment.

FIG. 6 illustrates a scanning device 200 in accordance with another embodiment. The scanning device 200 includes a transparent platen 202 secured at a base 204. In some embodiments, the base 204 may comprise a portion of a housing, such as the housing 20 of FIG. 1. A lid 206 is pivotally coupled to the base 204 via a pivot or hinge mechanism 210. In this embodiment, the colored code 24 may be positioned at an inside, or bottom, surface 211 of the lid 206.

The base 204 includes a transparent region 212. The transparent region 212 is shown as being separate from the platen 202, but in some embodiments may comprise a portion of the platen 202. The lid 206 may be moved to a closed position by pivoting the lid about the mechanism 210 such that the surface 211 is adjacent and substantially parallel the platen 202 and such that the colored code 24 is positioned adjacent, or over the transparent region 212. In the closed configuration an image detector (not shown) disposed inside the base 204 is optically coupled to the colored code 24 via the transparent region 212 such that the image detector may detect the colors of the colored code 24.

Figure 7:
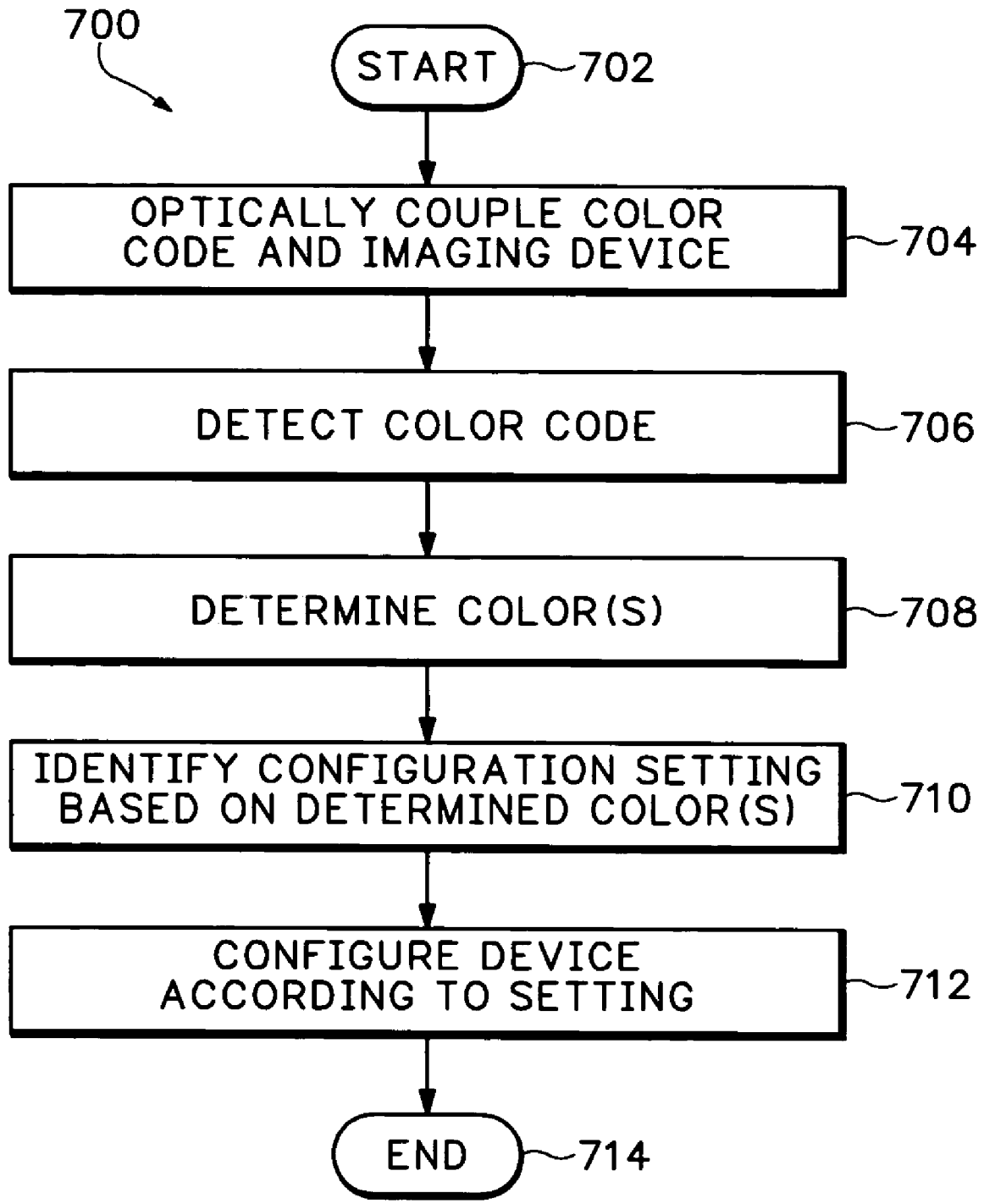
FIG. 7 is a flowchart illustrating a method in accordance with another example embodiment.

FIG. 7 is a flowchart 700 illustrating an example embodiment of a method. The method commences at block 702. At block 704, the colored code 24 is optically coupled with an imaging device, such as scanner 12. As described above, the colored code 24 may be optically coupled to the imaging device via light guides or directly, without light guides. Further, one or more transparent members may be disposed between the imaging device and the colored code 24.

Next, at block 706, the imaging device scans or otherwise detects the colored code 24. At block 708, the imaging device, or the imaging device in cooperation with the controller 14 determines one or more colors of the colored code. At block 710, the controller 14 determines one or more configuration settings based on the determined color or colors. In one embodiment, the controller 14 uses a lookup table that associates a configuration setting with a color. Using the lookup table, the controller 14 then identifies a configuration setting that is associated with the determined color. At block 712, the controller configures a device, such as a printer, scanner, or other suitable device, with the setting or settings identified based on the color or colors of the colored code 24. The flowchart 700 ends at block 714.

For example, the imaging device might scan the colored code and may determine that the colored code include a red marking, a green marking, and a yellow marking. The controller, using a lookup table for example, identifies a configuration setting associated with red, green, and yellow markings. The configuration setting associated with the red, green, and yellow markings may, for example, comprise a particular print speed and language setting. In this example, then, the controller configures the print engine 16 with the print speed setting and the control panel 22 with the language setting such that text displayed at the display 28 is in the language that corresponds with the language setting. This example is provided to illustrate a particular implementation and is non-limiting. A variety of other implementations may be used in accordance with the teachings herein.

In some embodiments, the markings of the colored code may be detected by the scanner in an unfocused manner, thus permitting the distance between the colored code and the scanner to vary. Further, in some applications where the colored code might not be precisely positioned relative to the scanner, the scanner may still be able to detect the colors, despite a low degree of focus of the scanner on the colored code.

For example, since some embodiments of the foregoing might not employ a high degree of focus, the present system and method may be used in many applications in which barcode technology is used. Given that embodiments of the present system and method might produce satisfactory results with a lower degree of focus than barcode technology, some embodiments of the present system and method may be advantageous over barcode technology.

While the present disclosure has been provided with reference to the foregoing embodiments, those skilled in the art will understand that many variations may be made therein without departing from the spirit and scope defined in the following claims. The foregoing embodiments are illustrative, and no single feature, procedure or element is essential to all possible combinations that may be claimed in this or a later application. Moreover, the description should be understood to include all novel and non-obvious combinations of elements described herein, and claims may be presented in this or a later application to any novel and non-obvious combination of these elements. Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the present disclosure. Where the claims recite "a" or "another" element or the equivalent thereof, such claims should be understood to include incorporation of one or more such elements, neither requiring nor excluding two or more such elements.

What is claimed is:

1. A device having a housing comprising:
    a scanner internal the housing;
    a scan code internal the housing and optically coupled to the scanner;
    a processor coupled to the scanner and adapted to configure the device based on the one or more colors of the scan code.

2. The device according to claim 1, wherein the device further comprises a bezel, the scan code being positioned at the bezel.

3. The device of claim 1, wherein the scan code comprises at least two distinct chromatic colors.

4. The device of claim 1, wherein the processor is configured to identify a language setting based on the one or more colors of the scan code.

5. The device of claim 1, further comprising a print engine internal the housing and coupled to the processor.

6. The device of claim 1, wherein the scan code comprises visually distinct colors and the processor is configured to process information obtained from each of the visually distinct colors.

7. A device comprising:
    a scanner;
    a scan code optically coupled to the scanner, the scan code including one or more colors;
    a processor coupled to the scanner and adapted to configure the device based on the one or more colors of the scan code, wherein the device further comprises a bezel having openings through which user inputs may extend, the scan code adhered to the bezel.

8. A device comprising:
    colored indicia including at least two different colors, the colored indicia on the device;
    a scan engine disposed internal the device and optically coupled with the colored indicia and configured to scan the colored indicia and to identify the at least two different colors;
    a controller coupled to the scan engine and configured to adjust a device setting based on the at least two different colors determined by the scan engine.

9. The device of claim 8 wherein the scan engine is configured to determine the relative positions of the at least two different colors, the controller being configured to adjust the device setting based on the relative positions of the at least two different colors.

10. The device of claim 8, wherein the colored indicia includes chromatic colors.

11. The device of claim 8, wherein the colored indicia is disposed on bezel mounted on the device.

12. The device of claim 8, further comprising fiber optic cable disposed between the scan engine and the colored indicia.

13. The device of claim 8, wherein the device setting is a language setting.

14. The device of claim 8, wherein the device setting disables at least one device function.

15. The device of claim 8, wherein the device setting enables at least one device function.

16. A method, comprising:
    scanning a colored code using a scanner disposed internal a device, the colored code disposed internal the device;
    adjusting a setting of the device based on at least one color of the colored code.

17. The method of claim 16, wherein the setting comprises a localization setting.

18. The method of claim 16, wherein the setting comprises a language setting.

19. The method of claim 16, wherein the color is a chromatic color.

* * * * *